United States Patent
Binder et al.

(10) Patent No.: US 11,411,238 B2
(45) Date of Patent: Aug. 9, 2022

(54) METHOD FOR OPERATING A FUEL CELL SYSTEM OF A MOTOR VEHICLE, AND MOTOR VEHICLE

(71) Applicant: Bayerische Motoren Werke Aktiengesellschaft, Munich (DE)

(72) Inventors: Juergen Binder, Munich (DE); Holger Hummel, Munich (DE); Markus Koban, Pfaffenhofen an der Ilm (DE); Martin Scherrer, Poing (DE); Danilo Zimmermann, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/976,108

(22) PCT Filed: Feb. 26, 2019

(86) PCT No.: PCT/EP2019/054719
§ 371 (c)(1),
(2) Date: Aug. 27, 2020

(87) PCT Pub. No.: WO2019/166427
PCT Pub. Date: Sep. 6, 2019

(65) Prior Publication Data
US 2020/0411887 A1    Dec. 31, 2020

(30) Foreign Application Priority Data
Mar. 2, 2018 (DE) .................. 10 2018 203 184.3

(51) Int. Cl.
*H01M 8/04* (2016.01)
*H01M 8/04746* (2016.01)
(Continued)

(52) U.S. Cl.
CPC ......... *H01M 8/04753* (2013.01); *B60L 50/70* (2019.02); *B60L 58/30* (2019.02);
(Continued)

(58) Field of Classification Search
CPC ......... H01M 8/04228; H01M 8/04753; H01M 8/04303
See application file for complete search history.

(56) References Cited

U.S. PATENT DOCUMENTS

| | | | |
|---|---|---|---|
| 2010/0330449 A1* | 12/2010 | An | H01M 8/0247 429/434 |
| 2014/0186732 A1 | 7/2014 | Tachibana et al. | |
| 2017/0349040 A1* | 12/2017 | Nagaosa | B60L 50/75 |

FOREIGN PATENT DOCUMENTS

| | | |
|---|---|---|
| DE | 11 2012 003 641 T5 | 5/2014 |
| DE | 10 2014 221 242 A1 | 4/2016 |

OTHER PUBLICATIONS

International Search Report (PCT/ISA/210) issued in PCT Application No. PCT/EP2019/054719 dated May 15, 2019 with English translation (four (4) pages).

(Continued)

*Primary Examiner* — Olatunji A Godo
(74) *Attorney, Agent, or Firm* — Crowell & Moring LLP

(57) ABSTRACT

A method for operating a fuel cell system of a motor vehicle includes the steps of: i) detecting whether a washing process of the motor vehicle in a wash facility for cleaning the exterior of the motor vehicle is taking place or is imminent and ii) reducing the supply of an oxidizing agent to a fuel cell stack of the fuel cell system when it has been detected that a washing process is taking place or is imminent.

11 Claims, 1 Drawing Sheet

(51) Int. Cl.
*H01M 8/04228* (2016.01)
*H01M 8/04303* (2016.01)
*B60L 50/70* (2019.01)
*B60L 58/30* (2019.01)
*H01M 8/04082* (2016.01)
*H01M 8/04313* (2016.01)
*H01M 8/04955* (2016.01)

(52) U.S. Cl.
CPC ... *H01M 8/04201* (2013.01); *H01M 8/04228* (2016.02); *H01M 8/04303* (2016.02); *H01M 8/04313* (2013.01); *H01M 8/04955* (2013.01); *H01M 2250/20* (2013.01)

(56) References Cited

OTHER PUBLICATIONS

German-language Written Opinion (PCT/ISA/237) issued in PCT Application No. PCT/EP2019/054719 dated May 15, 2019 (six (6) pages).
German-language Search Report issued in German Application No. 10 2018 203 184.3 dated Nov. 27, 2018 with partial English translation (11 pages).

\* cited by examiner

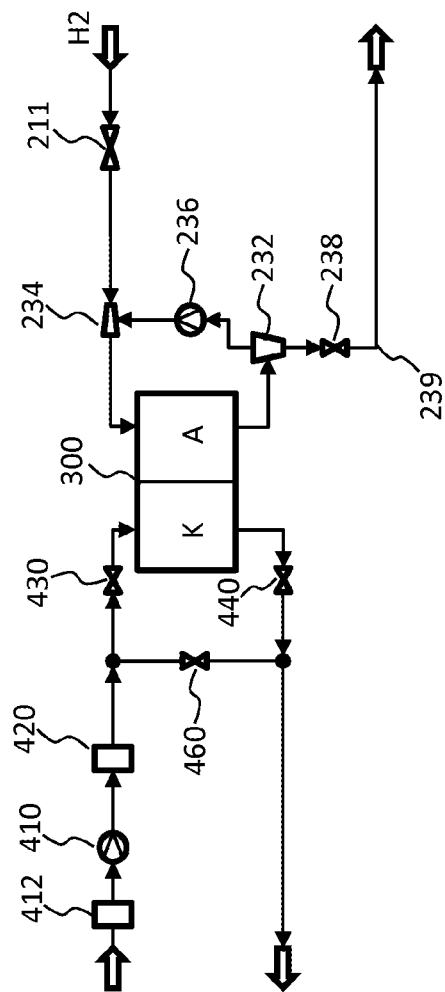

METHOD FOR OPERATING A FUEL CELL SYSTEM OF A MOTOR VEHICLE, AND MOTOR VEHICLE

BACKGROUND AND SUMMARY OF THE INVENTION

The technology disclosed herein relates to a method for operating a fuel cell system of a motor vehicle, and to a motor vehicle.

Motor vehicles which are equipped with a fuel cell system are known per se. As a rule, fuel cell systems suck in ambient air and convey the ambient air for the electrochemical reaction to the fuel cell stack. It is to be noted here that any harmful substances as far as possible do not pass into the fuel cell stack, since harmful substances of this type can have a negative effect on the performance of the fuel cell system. For this reason, an air filter is as a rule provided upstream of the oxidizing agent feeder.

It is one preferred object of the technology disclosed herein to reduce or to eliminate at least one disadvantage of a previously known solution or to propose an alternative solution. In particular, it is one preferred object of the technology disclosed herein to keep harmful substances away from the fuel cell stack. Further preferred objects can result from the advantageous effects of the technology disclosed herein. The object/objects is/are achieved by way of the subject matter of the independent patent claims. The dependent claims represent preferred refinements.

The technology disclosed herein is based on the concept of not sucking in ambient air in situations in which the ambient air probably has an increased concentration of harmful substances.

In particular, the technology disclosed herein relates to a method for operating a fuel cell system of a motor vehicle. The method comprises the steps:
 detecting whether a washing operation of the motor vehicle in a car wash for external cleaning of the motor vehicle is taking place or is imminent, and
 reducing the feed of oxidizing agent to a fuel cell stack of the fuel cell system if it has been detected that a washing operation is taking place or is imminent.

Furthermore, the disclosed technology relates to a motor vehicle which is set up to carry out the methods disclosed herein.

In one particularly preferred refinement of the technology disclosed herein, the feed of oxidizing agent is reduced to such an extent that the feed of oxidizing agent is halted substantially completely (that is to say, apart from quantities, for example on account of leakage, which are insignificant for the effects which are aimed for by way of the technology disclosed herein (for example, fewer harmful substances in the fuel cell stack)) or completely.

It can therefore advantageously be avoided that hazardous vapors pass into the fuel cell stack during the washing operation and have a negative influence on said fuel cell stack.

The technology disclosed herein relates to a fuel cell system with at least one fuel cell. The fuel cell system is intended, for example, for mobile applications such as motor vehicles (for example, passenger cars, motorcycles, commercial vehicles), in particular for the provision of the energy for at least one drive unit for the propulsion of the motor vehicle. In its simplest form, a fuel cell is an electrochemical energy converter which converts fuel and oxidizing agent into reaction products and in the process produces electricity and heat. The fuel cell comprises an anode and a cathode which are separated by way of an ion-selective or ion-permeable separator. The anode is supplied with fuel. Preferred fuels are: hydrogen, low molecular weight alcohol, biofuels, or liquefied natural gas. The cathode is supplied with oxidizing agent. Preferred oxidizing agents are, for example, air, oxygen and peroxides. The ion-selective separator can be configured, for example, as a proton exchange membrane (PEM). A cation-selective polymer electrolyte membrane is preferably used. Materials for a membrane of this type are, for example: Nafion®, Flemion® and Aciplex®.

In addition to the at least one fuel cell, a fuel cell system comprises peripheral system components (BOP components) which can be used in the case of the operation of the at least one fuel cell. A plurality of fuel cells are as a rule combined to form a fuel cell stack.

The fuel cell system comprises an anode subsystem which is configured by the fuel-conducting components of the fuel cell system. A main object of the anode subsystem is the introduction and distribution of fuel to the electrochemically active surfaces of the anode space and the discharge of anode off-gas.

The fuel cell system comprises a cathode subsystem. The cathode subsystem is formed from the components which conduct oxidizing agent. A cathode subsystem can have at least one oxidizing agent feeder, at least one cathode inflow path which leads to the cathode inlet, at least one cathode off-gas path which leads away from the cathode outlet, a cathode space in the fuel cell stack, stack shut-off valves which shut off the cathode space, and further elements. A main object of the cathode subsystem is the introduction and distribution of oxidizing agent to the electrochemically active surfaces of the cathode space and the discharge of unused oxidizing agent.

The technology disclosed herein comprises at least one oxidizing agent feeder. The oxidizing agent feeder is set up to convey the oxidizing agent which participates in the electrochemical reaction to the at least one fuel cell. The oxidizing agent conveyor (also called a fluid conveying device) can be configured, for example, as a compressor, and particularly preferably as an aerostatically mounted turbo-compressor or centrifugal compressor.

Furthermore, the system disclosed herein comprises at least one control unit. The control unit is set up, inter alia, to carry out the method steps disclosed herein. To this end, in a manner which is based on signals which are provided, the control unit can at least partially and preferably completely control the actuators of the system in a closed control loop or an open control loop. The control unit can influence at least the fuel cell system, in particular the cathode subsystem, the anode subsystem and/or the cooling system of the fuel cell system. As an alternative or in addition, the control unit can also be integrated into another control unit, for example into a higher-level control unit. The control unit can interact with further control units of the motor vehicle.

A car wash for external cleaning of the motor vehicle is known per se. This can be, in particular, a gantry car wash or an in-line car wash. As a rule, the car wash comprises a conveying device (for example, conveyor belt), with the aid of which the motor vehicle is conveyed through the car wash which is as a rule configured as a tunnel. A cleaning agent which in some circumstances can comprise harmful substances is as a rule used in car washes of this type.

In accordance with the method disclosed herein, the motor vehicle is set up to detect whether a washing operation is taking place or is imminent. In this regard, all the methods known from the prior art for the detection of a car wash can in principle be used.

For the detection of the car wash, the motor vehicle can expediently have a car wash mode. If, for example, the motor vehicle determines that the car wash mode is or has been activated, the motor vehicle or the fuel cell system can reduce the feed of oxidizing agent to the fuel cell stack.

In one refinement, the motor vehicle can detect the washing operation and/or activate a car wash mode on the basis of:
- a geoinformation item which is indicative of a car wash;
- the position of the driving direction selector lever;
- a communication signal which is indicative of a car wash;
- an evaluation on the basis of the environment recognition system of the motor vehicle; and/or
- a driver input.

The motor vehicle can activate the car wash mode, for example, if the driving direction selector lever is situated in a position (N position) which is indicative of the standstill state of the motor vehicle and at the same time the wheels of the motor vehicle are rotating.

In one preferred refinement, the oxidizing agent feeder is transferred into a rest state if it has been detected that a washing operation is taking place or is imminent. As an alternative or in addition, the oxidizing agent can be conducted past the fuel cell stack via at least one bypass.

Furthermore, it can be provided that the cathode-side stack shut-off valves are closed if it has been detected that the washing operation is taking place or is imminent. Here, the cathode-side stack shut-off valves are those valves which are configured on or directly adjacently with respect to the fuel cell stack, in order to shut off the cathode space of the fuel cell stack.

The fuel cell system is preferably transferred into a rest state in such a way that, after termination of the washing operation, the fuel cell system can be transferred into the state which provides electric energy in less than 30 seconds or less than 20 seconds. Different method steps are preferably run through in the case of the transfer of the fuel cell system into a rest state before or during a washing operation than in the case of the switch-off of the fuel cell system, which method steps are run through, for example, in the case of parking of the motor vehicle. Here, the rest state of the fuel cell system is a state, in which the feed of oxidizing agent to the fuel cell stack is reduced or prevented. Different method steps can preferably be run through in the case of the transfer of the fuel cell system into the state which provides electric energy after the washing operation than in the case of starting of a fuel cell system which has previously been switched off. In this way, the availability and/or the response behavior of the fuel cell system can be improved.

The control unit of the motor vehicle is as a rule set up to detect whether a washing operation of the motor vehicle in a car wash is taking place or is imminent. The motor vehicle can be set up to reduce the feed of oxidizing agent to the fuel cell stack of the fuel cell system if it has been detected that a washing operation is taking place or is imminent. The control unit can be set up to transfer the oxidizing agent feeder into the rest state if it has been detected that the washing operation is taking place or is imminent. The control unit can be set up to reduce the feed of oxidizing agent to the fuel cell stack if it has been detected that the car wash mode is or has been activated.

In other words, the technology disclosed herein relates to a method for operating a fuel cell system, a car wash being detected and being reported to the operating strategy system of the fuel cell. The operating strategy system of the fuel cell then ensures the switching off of the fuel cell during the passage through the car wash. In this way, the intake of water in a car wash can advantageously be avoided.

BRIEF DESCRIPTION OF THE DRAWING

FIG. 1 is an embodiment of a fuel cell system with a cathode subsystem and an anode subsystem.

DETAILED DESCRIPTION OF THE DRAWING

FIG. 1 is an embodiment of a fuel cell system with a cathode subsystem and an anode subsystem. The cooling circuit has been omitted here for reasons of simplicity. The oxidizing agent feeder 410 sucks in ambient air and compresses it. An air filter 412 which cleans the ambient air is arranged upstream of the oxidizing agent feeder 410. Here, an intercooler 420 for cooling the compressed ambient air is provided downstream of the oxidizing agent feeder 410. Here, the cathode-side bypass 460 branches off downstream of the intercooler 420, which bypass 460 opens into the cathode off-gas line downstream of the cathode K. Furthermore, the cathode-side stack shut-off valves 430, 440 are shown.

The fuel cell stack 300 comprises a multiplicity of fuel cells which have not been shown here. Here, the fuel cell stack 300 is divided in a merely diagrammatic manner into a cathode K and into an anode A. In the anode inflow path, the anode subsystem comprises a fuel source H2, a shut-off valve 211 and a recirculation jet pump 234. Here, a water separator 232 and a recirculation pump 236 are provided downstream of the anode A. Furthermore, an anode flush valve 238 and an anode flush line 239 are provided downstream of the water separator 232.

In one preferred refinement, the oxidizing agent feeder 410 is switched off if it has been detected that a washing operation in a car wash is taking place or is imminent. As an alternative, it can be provided that the oxidizing agent feeder 410 is operated further at a very low rotational speed and the oxidizing agent is discharged via the bypass 460. Furthermore, it can be provided that the cathode-side stack shut-off valves 430, 440 are closed if it has been detected that a washing operation in a car wash is taking place or is imminent.

In the context of the technology disclosed herein, the term "substantially" (for example, "substantially perpendicular axis") comprises in each case the precise property and/or the precise value (for example, "perpendicular axis") and in each case deviations which are insignificant for the function of the property/the value (for example, "tolerable deviation from a perpendicular axis").

In the context of the technology disclosed herein, the term "is imminent" means that the motor vehicle is being prepared, for example, for passing through the car wash, or the passage through the car wash has just begun, and comprises, for example, a time period of less than 5 minutes or less than 2 minutes or less than 1 minute.

The preceding description of the present invention serves merely for illustrative purposes and not for the purpose of the restriction of the invention. Within the context of the invention, various amendments and modifications are possible without departing from the scope of the invention and its equivalents.

What is claimed is:

1. A method for operating a fuel cell system of a motor vehicle, comprising the steps of:

detecting whether a washing operation of the motor vehicle in a car wash for external cleaning of the motor vehicle is taking place or is imminent, wherein the washing operation is performed while the motor vehicle travels through the car wash; and reducing a feed of oxidizing agent to a fuel cell stack of the fuel cell system when it has been detected that the washing operation is taking place or is imminent, such that the feed of the oxidizing agent is reduced during the washing operation.

2. The method according to claim 1, wherein an oxidizing agent feeder is transferred into a rest state when it has been detected that the washing operation is taking place or is imminent.

3. The method according to claim 1, wherein the oxidizing agent is conducted past the fuel cell stack via at least one bypass.

4. The method according to claim 1, wherein stack shut-off valves of the fuel cell system are closed when it has been detected that the washing operation is taking place or is imminent.

5. The method according to claim 1, wherein the motor vehicle has a car wash mode, and the feed of oxidizing agent to the fuel cell stack is reduced when the car wash mode is or has been activated.

6. The method according to claim 1, wherein the motor vehicle detects the washing operation with consideration of a position of a driving direction selector lever.

7. The method according to claim 1, wherein different method steps are carried out in a case of a transfer of the fuel cell system into a state which provides electric energy after the washing operation than in the case of a startup of the previously deactivated fuel cell system.

8. A motor vehicle with a fuel cell system, the motor vehicle being configured to carry out the acts of:

detecting whether a washing operation of the motor vehicle in a car wash for external cleaning of the motor vehicle is taking place or is imminent, wherein the washing operation is performed while the motor vehicle travels through the car wash; and reducing a feed of oxidizing agent to a fuel cell stack of the fuel cell system when it has been detected that the washing operation is taking place or is imminent, such that the feed of the oxidizing agent is reduced during the washing operation.

9. A motor vehicle with a fuel cell system, comprising:

a control unit of the motor vehicle configured to:

detect whether a washing operation of the motor vehicle in a car wash is taking place or is imminent, wherein the washing operation is performed while the motor vehicle travels through the car wash, and reduce feed of oxidizing agent to a fuel cell stack of the fuel cell system when it has been detected that the washing operation is taking place or is imminent, such that the feed of the oxidizing agent is reduced during the washing operation.

10. The motor vehicle according to claim 9, wherein the control unit is configured to transfer an oxidizing agent feeder into a rest state when it has been detected that the washing operation is taking place or is imminent.

11. The motor vehicle according to claim 9, wherein the motor vehicle comprises a car wash mode; and the control unit is configured to reduce the feed of oxidizing agent to the fuel cell stack when the car wash mode is or has been activated.

\* \* \* \* \*